United States Patent
Choo et al.

(10) Patent No.: US 10,820,254 B2
(45) Date of Patent: Oct. 27, 2020

(54) METHOD AND APPARATUS FOR SCHEDULING IN WIRELESS NETWORK

(71) Applicant: Research & Business Foundation Sungkyunkwan University, Suwon-si (KR)

(72) Inventors: Hyunseung Choo, Gwacheon-si (KR); Hyo Hoon Ahn, Anyang-si (KR); Duc-Tai Le, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 150 days.

(21) Appl. No.: 16/120,711

(22) Filed: Sep. 4, 2018

(65) Prior Publication Data

US 2019/0075509 A1 Mar. 7, 2019

(30) Foreign Application Priority Data

Sep. 1, 2017 (KR) ........................ 10-2017-0111882

(51) Int. Cl.
*H04W 40/24* (2009.01)
*H04W 74/08* (2009.01)
(Continued)

(52) U.S. Cl.
CPC ....... *H04W 40/248* (2013.01); *H04L 12/1881* (2013.01); *H04W 8/005* (2013.01);
(Continued)

(58) Field of Classification Search
CPC ... H04W 40/248; H04W 40/02; H04W 40/30; H04W 72/0446; H04W 8/005; H04W 74/0816; H04L 12/1881
See application file for complete search history.

(56) References Cited

U.S. PATENT DOCUMENTS

| 5,712,712 A | * | 1/1998 | Sayward | ............ H04N 1/00204 358/403 |
| 2009/0154482 A1 | * | 6/2009 | Ham | ....................... H04L 45/02 370/408 |

(Continued)

FOREIGN PATENT DOCUMENTS

KR 10-1533037 B1 7/2015

OTHER PUBLICATIONS

Duc Tai Le, et al., "LABS: Latency aware broadcast scheduling in uncoordinated Duty-Cycled Wireless Sensor Networks," *Journal of Parallel and Distributed Computing*, vol. 74, Issue 11, Nov. 2014, 99. 3141-3152 (12 pages, in English).

(Continued)

*Primary Examiner* — Will W Lin
(74) *Attorney, Agent, or Firm* — NSIP Law

(57) ABSTRACT

The present disclosure relates to a scheduling method and apparatus of a wireless network and a scheduling method of a wireless network is a scheduling method of a wireless network including a plurality of nodes, the method including: generating a broadcast tree to transmit data from a source node to a sink node, dividing nodes included in the broadcast tree into a primary node which does not allow collision and a secondary node which allows collision at the time of receiving data, in accordance with predetermined criteria; and allocating a time slot in which nodes included in the broadcast tree operate, based on the divided result.

15 Claims, 7 Drawing Sheets

(51) Int. Cl.
   *H04W 8/00*    (2009.01)
   *H04W 72/04*   (2009.01)
   *H04W 40/30*   (2009.01)
   *H04W 40/02*   (2009.01)
   *H04L 12/18*   (2006.01)

(52) U.S. Cl.
   CPC ........... *H04W 40/02* (2013.01); *H04W 40/30* (2013.01); *H04W 72/0446* (2013.01); *H04W 74/0816* (2013.01)

(56) References Cited

U.S. PATENT DOCUMENTS

2010/0149983 A1*  6/2010  Lee .................... H04L 12/189
                                                    370/235
2017/0332351 A1* 11/2017  Nebat ................ H04L 12/1881
2020/0014550 A1*  1/2020  Xu ..................... H04L 12/1881

OTHER PUBLICATIONS

Duc-Tai Le, et al., "Parameterized Collision Tolerant Scheduling for Broadcast latency Minimization in Duty-cycled Wireless Sensor Networks," *Proceedings of the 10$^{th}$ International Conference on Ubiquitous Information Management and Communication*, Article No. 103, Danang, Vietnam, Jan. 2016 (4 pages, in English).
Korean Office Action dated Nov. 26, 2018, in corresponding Korean Application No. 10-2017-0111882 (5 pages, in Korean).

\* cited by examiner

[FIG. 1A]
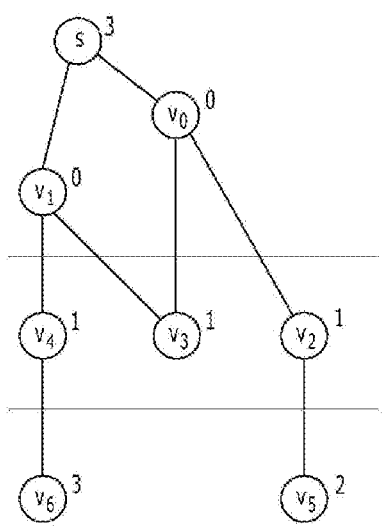
[FIG. 1B]
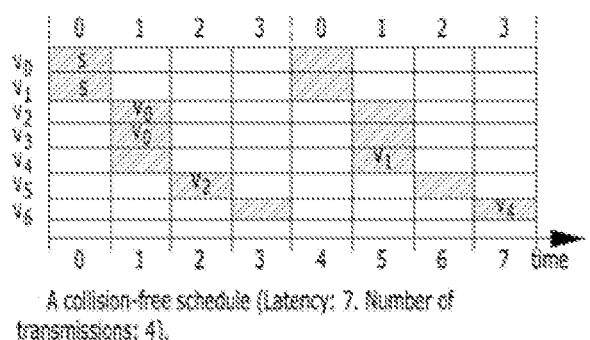
A collision-free schedule (Latency: 7. Number of transmissions: 4).

[FIG. 1C]
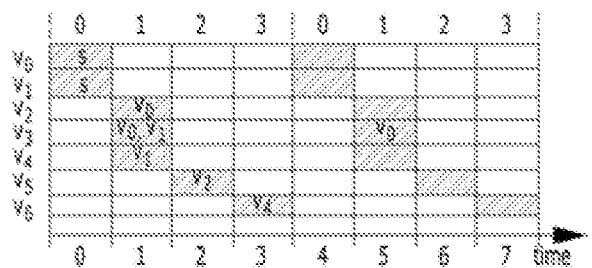
A collision-tolerant schedule (Latency: 5, Number of transmissions: 5).
[FIG. 2]
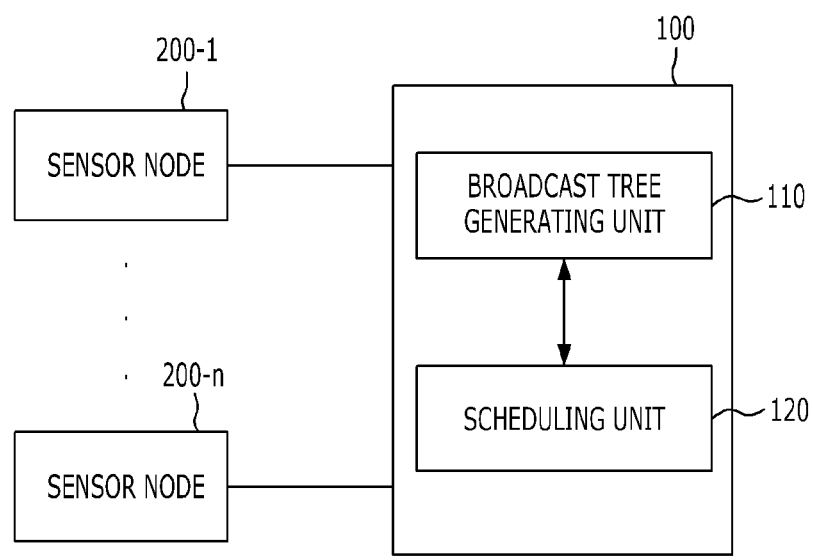

[FIG. 3A]
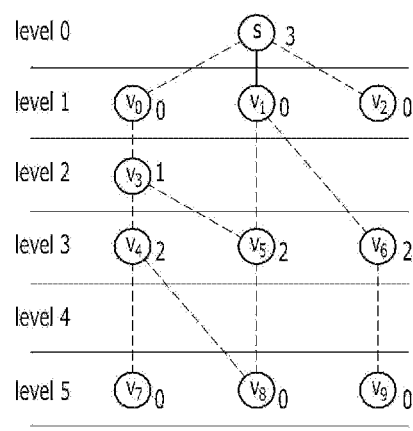
[FIG. 3B]
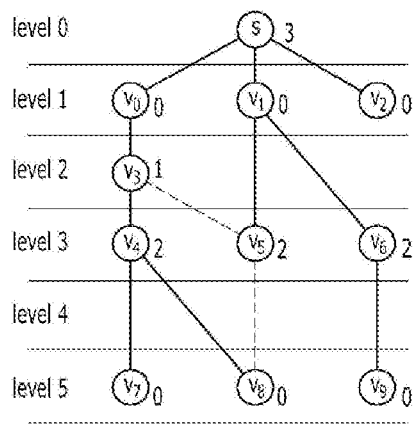

[FIG. 4A]
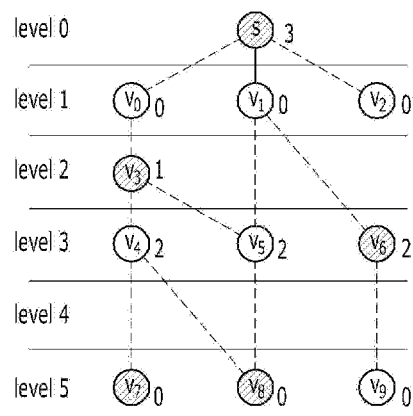
[FIG. 4B]
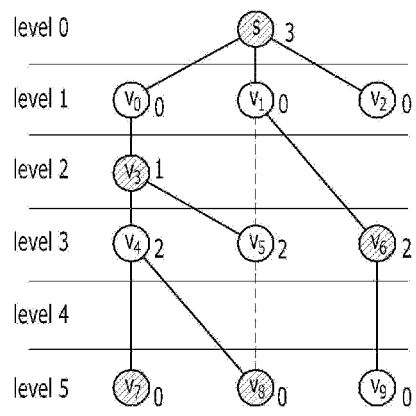

[FIG. 5A]
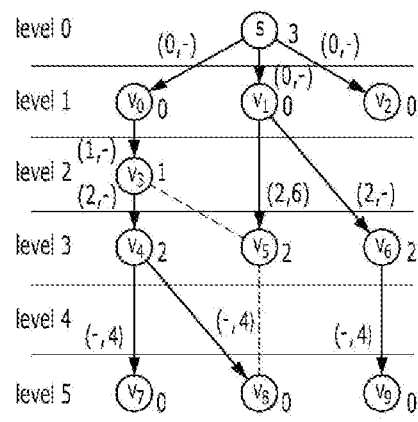
[FIG. 5B]
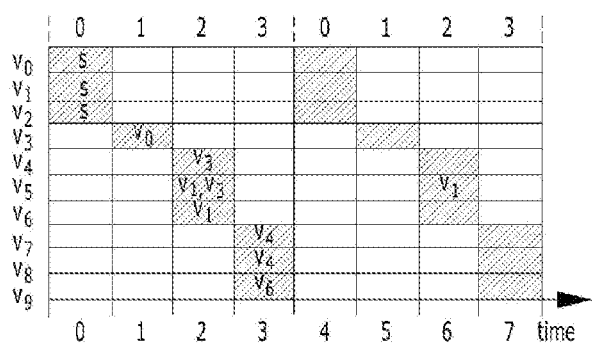

[FIG. 6A]
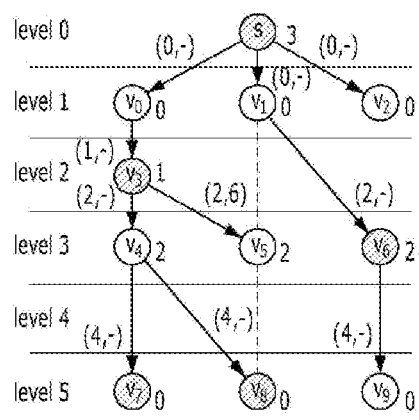
[FIG. 6B]
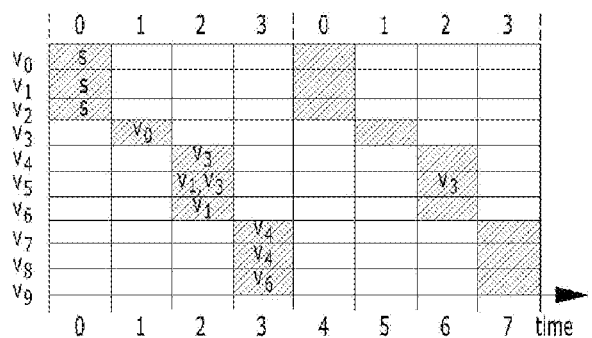

[FIG. 7]
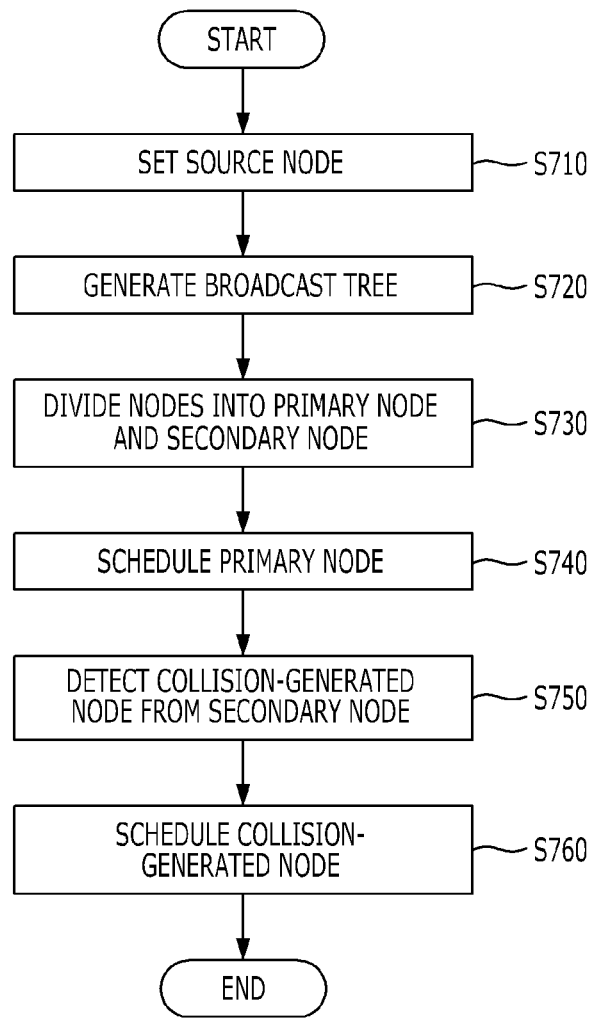

METHOD AND APPARATUS FOR SCHEDULING IN WIRELESS NETWORK

CROSS-REFERENCE TO RELATED APPLICATIONS

This application claims the priority of Korean Patent Application No. 10-2017-0111882 filed on Sep. 1, 2017, in the Korean Intellectual Property Office, the disclosure of which is incorporated herein by reference.

BACKGROUND

Field

The present disclosure relates to a method and an apparatus for scheduling in a wireless network, and more particularly, to a method and an apparatus for scheduling in a wireless network which allows collision in a node which is not important at the time of scheduling data transmission of the wireless network to save a broadcast waiting time.

Description of the Related Art

Generally, in a wireless sensor network, a node having data transmits data in a broadcast manner in order to transmit data to all neighboring nodes within its transmission range.

However, when the data is transmitted in a broadcast manner, if the data is simultaneously transmitted from a plurality of sensor nodes, one reception node simultaneously receives data from two or more transmission nodes so that a data collision problem may be incurred. Further, transmission delay may be caused until all the sensor nodes on the wireless sensor network receive the data.

In the meantime, in order to save the energy consumption of the nodes in the wireless sensor network, broadcast scheduling methods in a wireless sensor network to which a duty cycle repeating an active state and an inactive state is applied have been developed.

In the wireless sensor network to which the duty cycle is applied, a sensor node may receive data only in its active time slot. Therefore, since the sensor node having data may transmit data only after a neighboring node which has not yet received data wakes up, the data transmission delay may be caused. Further, the sensor node may perform only one of data transmission or reception in one time slot, so that data transmission delay and collision problem may become more serious.

In order to solve the above-mentioned problem, when the scheduling is performed to avoid all collisions of the nodes, additional network delay may be caused. Therefore, a method for efficiently processing broadcast scheduling by variably allowing collision between nodes in a wireless sensor network is necessary.

As a related art, there is Korean Unexamined Patent Application Publication No. 10-2008-0102882 (entitled a communication method on a sensor network using a variable duty cycle).

SUMMARY

An object to be achieved by the present disclosure is to provide a method and an apparatus for scheduling in a wireless network which allows collision in a node which is not important at the time of scheduling data transmission of a wireless network to reduce a broadcast waiting time.

Technical problems of the present disclosure are not limited to the above-mentioned technical problem(s), and other technical problem(s), which is (are) not mentioned above, can be clearly understood by those skilled in the art from the following descriptions.

According to an exemplary embodiment of the present disclosure, a scheduling method of a wireless network is a scheduling method of a wireless network including a plurality of nodes, the method including: generating a broadcast tree to transmit data from a source node to a sink node, dividing nodes included in the broadcast tree into a primary node which does not allow collision and a secondary node which allows collision at the time of receiving data, in accordance with predetermined criteria; and allocating a time slot in which nodes included in the broadcast tree operate, based on the divided result.

Desirably, the allocating of a time slot may include detecting a collision-generated node among nodes included in the secondary node; and reallocating a time slot in which the collision-generated node operates.

Desirably, during the reallocating of a time slot, a time slot of a next schedule period may be reallocated to the collision-generated node and a transmission node which transmits the data may be scheduled in the reallocated time slot.

Desirably, the predetermined criteria may include whether the corresponding node is a leaf node.

Desirably, during the dividing, when the node is not a leaf node, the node may be distinguished as a primary node and when the node is a leaf node, the node may be distinguished as a secondary node.

Desirably, during the generating of a broadcast tree, when the broadcast tree is generated based on an order, a parent node is sequentially set from a node having the most sensor nodes which are not covered among child nodes of the source node to hierarchically form the plurality nodes by a plurality of levels to generate the order-based broadcast tree.

Desirably, during the generating of a broadcast tree, when the broadcast tree is generated based on maximum independent set information, a node having the highest order at every level set with respect to the source node is selected as an independent node from the broadcast tree and all nodes adjacent to the selected independent node are set as dependent nodes, and connected in the order from the independent node to the dependent node at each level to generate the broadcast tree.

According to another exemplary embodiment of the present disclosure, a scheduling apparatus of a wireless network includes: a broadcast tree generating unit which generates a broadcast tree to transmit data from a source node in which data to be transmitted is generated to a sink node among a plurality of nodes of a wireless network, and a scheduling unit which divides the nodes included in the broadcast tree into a primary node in which the collision is not allowed at the time of data reception and a secondary node in which the collision is allowed according to predetermined criteria and allocates time slots in which the nodes included in the broadcast tree operate, based on the divided result.

Desirably, the scheduling unit may detect a collision-generated node among nodes included in the secondary node and may reallocate a time slot in which the collision-generated node operates.

Desirably, the scheduling unit may reallocate a time slot of a next schedule period to the collision-generated node and schedule a transmission node which transmits the data to the reallocated time slot.

Desirably, the predetermined criteria are whether the corresponding node is a leaf node.

Desirably, when the node is not a leaf node or a common reception node, the scheduling unit may distinguish the node as a primary node and when the node is a leaf node or a common reception node, distinguish the node as a secondary node.

Desirably, when the broadcast tree is generated based on an order, the broadcast tree generating unit may sequentially set a parent node from a node having the most sensor nodes which are not covered among child nodes of the source node to hierarchically form the plurality of sensor nodes by a plurality of levels to generate the order-based broadcast tree.

Desirably, when the broadcast tree is generated based on maximum independent set information, the broadcast tree generating unit may select a sensor node having the highest order at every level set with respect to the source node as an independent node from the broadcast tree and set all nodes adjacent to the selected independent node as dependent nodes, and connect all the nodes in the order from the independent node to the dependent node at each level to generate the broadcast tree.

According to the present disclosure, collision in a node which is not important is considered at the time of scheduling the data transmission scheduling in a wireless network so that a broadcast waiting time may be saved.

The effects of the present disclosure are not limited to the aforementioned effects, and various other effects are included within a range which is obvious to those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1A, FIG. 1B and FIG. 1C are an exemplary view for comparing collision-free scheduling and collision-tolerant scheduling according to the present disclosure;

FIG. 2 is a block diagram illustrating a configuration of a scheduling apparatus of a wireless network according to an exemplary embodiment of the present disclosure;

FIG. 3A and FIG. 3B are exemplary views for explaining an order-based broadcast tree according to an exemplary embodiment of the present disclosure;

FIG. 4A and FIG. 4B are exemplary views for explaining a MIS-based broadcast tree according to an exemplary embodiment of the present disclosure;

FIG. 5A and FIG. 5B are exemplary views for explaining scheduling of an order-based broadcast tree according to an exemplary embodiment of the present disclosure;

FIG. 6A and FIG. 6B are exemplary views for explaining scheduling of a MIS-based broadcast tree according to an exemplary embodiment of the present disclosure; and FIG. 7 is a flow chart illustrating a scheduling method of a wireless network according to an exemplary embodiment of the present disclosure.

DETAILED DESCRIPTION OF THE PREFERRED EMBODIMENT

Those skilled in the art may make various modifications to the present invention and the present invention may have various embodiments thereof, and thus specific embodiments will be illustrated in the drawings and described in detail in the detailed description. However, it should be understood that the present disclosure is not limited to the specific embodiments, but includes all changes, equivalents, or alternatives which are included in the spirit and technical scope of the present disclosure. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. The terminology "and/or" includes combinations of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present invention. A singular form may include a plural form if there is no clearly opposite meaning in the context. In the present invention, it should be understood that terminology "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present invention.

A wireless network according to the present disclosure is a network to which a duty cycle is applied. Here, the duty cycle means that sensor nodes repeat an active state and an inactive state to save energy consumption. That is, in the sensor nodes included in the wireless sensor network to which the duty cycle is applied, an active time and an inactive time are set. Here, a period when active times of all sensor nodes elapse once is referred to as a schedule period and a plurality of time slots is included in one schedule period. As such a duty cycle is applied, each sensor node performs any one of data transmission and reception in one time slot. Specifically, each sensor node may receive data from the other sensor node only during its active time. Further, each sensor node may transmit its own data to the other sensor node regardless of the active time and inactive time.

In the meantime, in the wireless sensor network according to the present disclosure, a sensor node (hereinafter, referred to as a "source node") in which data to be transmitted is generated transmits the data to all the remaining sensor nodes in the network. In this case, each of sensor nodes of the wireless sensor network may perform broadcast transmission to transmit data to all the neighboring nodes within its own transmission range.

As described above, when the broadcast transmission is performed in the wireless sensor network to which the duty cycle according to the present disclosure is applied, node collision that a plurality of sensor nodes transmits data to the same sensor node in one time slot may be caused. Therefore, when data is transmitted from the source node to all the remaining sensor nodes, the scheduling apparatus of the wireless sensor network according to the present disclosure performs scheduling to allow node collision.

Hereinafter, exemplary embodiments according to the present invention will be described in detail with reference to accompanying drawings.

FIG. 1 is an exemplary view for comparing collision-free scheduling and collision-tolerant scheduling according to the present disclosure.

A broadcast scheduling technique of the related art such as ELAC, OTAB, and LABS prevents interference by identifying a common neighbor of multiple forwarding nodes through topology information. That is, the interference is prevented by allocating different transmission time slots to nodes having the common neighbor.

When the collision-free scheduling is performed on a communication graph as illustrated in FIG. 1A, a graph as illustrated in FIG. 1B may be obtained. Referring to FIG. 1B, a source node S broadcasts data to neighboring nodes v0 and v1 in a time slot 0. The node v0 and the node v1 are adjacent to a node v3 whose active slot is "1". In order to prevent the collision between common neighbors, the node v0 or the node v1 is allowed to transmit a message in a time slot 1 and the other one needs to be delayed until the next schedule period. That is, since the transmission of the node v1 is delayed, a neighboring node v4 of the node v1 receives data in a time slot 5 and transmits the received data to a node v6 in a time slot 7. The delay of the reception time of different nodes may affect a broadcast waiting time in different ways.

In the present disclosure, nodes in which the delayed reception time considerably increases the broadcast waiting time are referred to as primary nodes and the remaining nodes are referred to as secondary nodes. In the present disclosure, in order to minimize the broadcast delay, the primary nodes are preferentially used to perform scheduling of collision-free transmission. In the secondary nodes, collisions are allowed so that data transmission of the sensor nodes included in the primary nodes does not need to compete with all interfering transmissions. Therefore, the broadcast waiting time may be shortened. When all the primary nodes receive data, the secondary nodes may complete the broadcast without causing the collision. As described above, according to the present disclosure, the scheduling is performed while allowing the collision and the collision-tolerant scheduling may freely transmit data according to the order, that is, in the order from the primary node to the secondary node, rather than according to the level, without causing the collision. Further, data is additionally transmitted to collision-generated nodes which experience the collision in the corresponding time slot of the next schedule period so that the collision which may be generated in the secondary node may be accepted.

In the communication graph as illustrated in FIG. 1A, {v0, v1, v2, v4} are primary nodes and {v3, v5, v6} are secondary nodes. The nodes v0 and v1 are primary nodes so that even though the collision is caused in the common neighboring node v3, the scheduling is performed to transmit the data to the primary nodes v2 and v4 in the time slot 1. As a result, data may be received earlier than the collision-free schedule in the node v4. When data transmission to all the nodes included in the primary nodes is completed, the data is transmitted to the secondary nodes. That is, the node v2 transmits data to a neighboring node v5 at a time slot 3 and the node v4 transmits data to a neighboring node v6 at a time slot 4. The node v3 receives the data by additional transmission of the node v0 and the broadcast is completed in the time slot v5. As described above, the collision tolerant schedule allows the collision in the node v3 so that the broadcast waiting time may be saved.

FIG. 2 is a block diagram illustrating a configuration of a scheduling apparatus of a wireless network according to one exemplary embodiment of the present disclosure; FIG. 3A and FIG. 3B are exemplary views for explaining an order-based broadcast tree according to an exemplary embodiment of the present disclosure; FIG. 4A and FIG. 4B are exemplary views for explaining a MIS-based broadcast tree according to an exemplary embodiment of the present disclosure; FIG. 5A and FIG. 5B are exemplary views for explaining scheduling of an order-based broadcast tree according to an exemplary embodiment of the present disclosure; and FIG. 6A and FIG. 6B are exemplary views for explaining scheduling of a MIS-based broadcast tree according to an exemplary embodiment of the present disclosure.

Referring to FIG. 2, the scheduling apparatus 100 of the wireless network according to the exemplary embodiment of the present disclosure includes a broadcast tree generating unit 110 and a scheduling unit 120.

The broadcast tree generating unit 110 generates a broadcast tree to transmit data from a source node in which data to be transmitted is generated, among a plurality of sensor nodes 200-1 to 200-n (hereinafter, denoted by a reference numeral 200), to all the remaining sensor nodes. In this case, the broadcast tree generating unit 110 sets the source node as a root node to generate a broadcast tree to leaf nodes of the remaining sensor nodes.

That is, first, the broadcast tree generating unit 110 generates a tree in which only the source node is included. Thereafter, the broadcast tree generating unit 110 connects the nodes from the source node according to an order, rather than according to a level of the tree to configure a broadcast tree in which the waiting time is minimized. In this case, since the level of the node means a minimum waiting time when the node receives the broadcast data from the source node, the broadcast tree generating unit 110 connects the nodes according to the order, rather than the level of the tree, to configure a broadcast tree in which the waiting time is minimized.

The broadcast tree generating unit 110 estimates a data transmission path from the source node to all the remaining nodes (sink nodes) to estimate a shortest path in which a length of each path is the shortest. In this case, the path may be configured by the broadcast tree. Therefore, the path and the broadcast tree may be used as the same meaning.

Hereinafter, an order-based or MIS-based broadcast tree generating method by the broadcast tree generating unit 110 will be described.

First, the order-based broadcast tree generating method will be described.

When the broadcast tree is generated based on an order, the broadcast tree generating unit 110 sets a parent node and a child node for the remaining sensor nodes (that is, descendent nodes of the source node) other than the source node S. In the broadcast tree, each internal node transmits the data to the child node. In this case, in order to reduce the number of transmissions of the broadcast, it is necessary to select an upper level node as an internal node in the broadcast tree and in order to reduce the delay, it is necessary to minimize the number of internal nodes adjacent to the common neighbor.

To this end, the broadcast tree generating unit 110 connects a previously defined source node to a tree level in a given network at every level so that the broadcast tree with the source node as a foundation is generated.

Specifically, the broadcast tree generating unit 110 sets at least one sensor node having a level which is higher than the corresponding level as a parent candidate and selects a sensor node which is adjacent to the largest number of sensor nodes at the corresponding level among the parent candidates as a parent node and connects the sensor node to the child node to generate a broadcast tree. Here, the parent node is a transmission node which transmits data to a child node and relatively, the child node is a reception node which receives data from the parent node.

The broadcast tree generating unit 110 performs a process of connecting the parent node and the child nodes until all nodes in the network are included. By doing this, the sensor nodes may be hierarchically formed by a plurality of levels based on the transmission range for every node from the source node.

As a result, as illustrated in FIG. 3A and FIG. 3B, an order-based broadcast tree may be generated. The sensor nodes may be hierarchically formed by a plurality of levels based on a distance from the source node and the transmission range for every node.

Referring to FIG. 3A and FIG. 3B, a source node S is a root node, and a node v0, a node v1, and a node v2 are set as child nodes of the source node S.

In this case, the node v0 is a parent node of the node v3, the node v1 is parent nodes of the nodes v5 and v6. That is, the node v3 is a child node of the node v0 and the nodes v5 and v6 are set as child nodes of the node v1. A procedure of setting a parent node and a child node from a source node to all the remaining sensor nodes is performed through the above-described process and the broadcast tree is generated by performing the parent/child node setting procedure. Here, the parent node is a transmission node which transmits data to the child node and relatively, the child node is a reception node which receives data from the parent node.

Next, a maximal independent set (MIS) based broadcast tree generating method will be described.

When the broadcast tree is generated based on the MIS, the broadcast tree generating unit 110 selects a sensor having the highest order at each level as an independent node and sets all sensor nodes adjacent to the selected independent node as dependent nodes and connects the nodes from the independent node to the dependent node at each level to generate a broadcast tree. That is, the broadcast tree generating unit 110 connects the independent node at each level to the dependent node at a lower level to generate a broadcast tree. In this case, in order to reduce a size of the MIS, a node having the highest order, among nodes at the lowest level, is selected as an independent node so that the number of transmissions of broadcast may be reduced.

As a result, the broadcast tree generating unit 110 may generate the MIS-based broadcast tree as illustrated in FIG. 4A and FIG. 4B.

Referring to FIG. 4A and FIG. 4B, since the source node S is a root node and independent node, the node v0, node v1, and node v2 which are adjacent to the source node S are set as dependent nodes. There is only node v3 at a level 2, the node v3 is an independent node. At the level 3, the node v4 and the node v5 are adjacent to the node v3 at a level 3 so that the node v4 and the node v5 are set as dependent nodes and the node 6 which has the highest order among the remaining nodes becomes an independent node. A procedure of setting independent nodes and dependent nodes from the source node to all the remaining sensor nodes is performed through the above-described process and the broadcast tree is generated by performing the independent/dependent node setting procedure.

The broadcast tree generating unit 110 provides path estimating information including broadcast tree information and duty cycle information for each sensor node (that is, active time and inactive time information) to the scheduling unit 120.

For example, as illustrated in FIG. 1, each sensor node has any one active time from 0 to 3 and four time slots of the schedule period may be configured in accordance with the active time. As described above, the number of time slots for every schedule period may be set in accordance with the distribution of the active time for every sensor node of the wireless sensor network and the distribution of the active time of the sensor node may be variedly set in accordance with a condition that the minimum delay is satisfied in accordance with the network environment. Further, the active time for every sensor node may be randomly set.

The scheduling unit 120 divides the nodes included in the broadcast tree into a primary node in which the collision is not allowed at the time of data reception and a secondary node in which the collision is allowed according to predetermined criteria and allocates time slots in which the nodes included in the broadcast tree operate, based on the divided result.

That is, the scheduling unit 120 divides the nodes of the broadcast tree into the primary node and the secondary node based on predetermined criteria. Here, the primary node refers to a node which is relatively important and considerably increases the broadcast waiting time by the delayed reception time and the secondary nodes are not relatively important and may refer to remaining nodes excluding the primary node. Therefore, criteria for dividing the nodes into a primary node which is important and a secondary node which is not important are necessary. The criteria may include whether there is a leaf node of the corresponding node, the number of child nodes, a common reception node (a collision-generated node), and a delay time from the corresponding node to the leaf node. Here, the common reception node (a collision-generated node) refers to a node in which node collision is generated when data is received from two or more parent nodes (that is, transmission nodes).

When the nodes are divided into the primary node and the secondary node, the scheduling unit 120 allocates a time slot to operate the node to each node included in the primary node. In this case, the scheduling unit 120 may schedule the transmission node which transmits the data in the time slot allocated to each node.

Hereinafter, for the convenience of description, it will be described that the primary node and the secondary node are divided on the basis of a leaf node.

The scheduling unit 120 divides the broadcast tree into one set of primary nodes and one set of secondary nodes on the basis of whether it is a leaf node. For example, when the corresponding node is not a leaf node, the node is distinguished as a primary node and when the corresponding node is a leaf node, the node is distinguished as a secondary node.

When the nodes are divided into the primary node and the secondary node, the scheduling unit 120 allocates a time slot to operate the node to each node included in the primary node. In this case, the scheduling unit 120 may schedule the transmission node which transmits the data in the time slot allocated to each node. In other words, the scheduling unit 120 may schedule the nodes included in the primary node to receive data in a time slot allocated thereto, starting from the source node. In this case, the scheduling unit 120 schedules nodes included in the primary node to receive data without causing collision.

When the scheduling for the primary node is completed, the scheduling unit 120 detects a node in which collision is generated among nodes included in the secondary node and allocates a time slot in which the collision-generated node operates. In this case, the scheduling unit 120 reallocates a time slot of a next schedule period to the collision-generated node and schedules the transmission node which transmits data in the reallocated time slot.

The secondary node may include a node which receives broadcast data in advance, by the data transmission of the primary node, in addition to the node in which the collision is generated. Therefore, the scheduling unit 120 considers the secondary node which has already received the data as a redundant node to exclude the second node from the data scheduling, thereby preventing redundant transmission of the data. Further, the scheduling unit 120 detects a collision-generated node among the sensor nodes included in the secondary node using a pruning algorithm. Here, the collision-generated node refers to a sensor node in which node collision is generated when data is received from two or more parent nodes (that is, transmission nodes). The scheduling unit 120 allocates the time slot to transmit data to nodes remaining after excluding the nodes which receive data in advance and the collision-generated node from the secondary node and schedules the collision-generated node to receive data in a time slot of a next schedule period.

The secondary node may complete the broadcast without causing the collision through the above-described scheduling. The scheduling unit 120 according to the present disclosure freely transmits data to the primary and secondary nodes from the source node without causing collision, not in accordance with the level, but in accordance with the order and additionally transmits data to the nodes in which the collision is generated so that collision which may be generated in the secondary node may be accepted.

Hereinafter, an order-based or MIS-based scheduling method of the scheduling unit 120 will be described.

First, the order-based scheduling method will be described with reference to FIG. 5A and FIG. 5B. In FIG. 5B, it is illustrated that the schedule period is 0 and 1 and four time slots 0 to 3 are included at each schedule period.

When the broadcast tree as illustrated in FIG. 3B is given, the scheduling unit 120 divides nodes {s, v0, v1, v3, v4, v6} which are not leaf nodes in the broadcast tree as primary nodes and divides the leaf nodes {v2, v5, v7, v8, v9} as secondary nodes. Thereafter, the scheduling unit 120 allocates the nodes included in the primary node to the time slot to operate and schedules the data to be transmitted in the allocated time slot.

Specifically, the source node S is scheduled to transmit data in a time slot 0 of a first schedule period (that is, a schedule period 0). The source node S is scheduled as a transmission node for a node v0, a node v1, and a node v2 in a time slot 0 of the schedule period 0. This means that the node v0, the node v1, and the node v2 are allocated to the time slot 0 and scheduled to receive data in the time slot 0.

The node v3 is allocated to a time slot 1 and is scheduled to receive data in the time slot 1. That is, the node v3 is scheduled to receive data from the node v0 in the time slot 1. The node v4 is allocated to a time slot 2 and is scheduled to receive data in the time slot 2. That is, the node v4 is scheduled to receive data from the node v3 in the time slot 2. As described above, the time slot allocation to the primary node is sequentially performed. Here, even though the nodes v1 and v3 cause the collision in the common neighboring node v5, the nodes v1 and v3 are scheduled to transmit data in the time slot 2.

As described above, when scheduling for the primary node is completed, the scheduling unit 120 performs scheduling on the secondary node.

The secondary node includes {v2, v5, v7, v8, v9} and among them, a collision-generated node and a node which receives data in advance are detected. The node v2, the node v7, and the node v8 are scheduled to receive data from the primary node and the node v5 is a collision-generated node. Therefore, the scheduling unit 120 schedules only the node v5 of the secondary node. That is, the scheduling unit 120 reallocates the time slot 6 of the second schedule period (that is, the schedule period 1) to the node v5 which is a collision-generated node and schedules to receive data from the node v1 in the time slot 6.

As described above, the scheduling for all the descendent nodes of the source node is sequentially performed. As a result, as illustrated in FIGS. 5A and 5B, the time slot 6 is required until the broadcast of the data from the source node S to all the remaining nodes is completed.

Next, the MIS-based scheduling method will be described with reference to FIG. 6A and FIG. 6B. In FIG. 6B, it is illustrated that the schedule period is 0 and 1 and four time slots 0 to 3 are included at each schedule period.

When the broadcast tree as illustrated in FIG. 4B is given, the scheduling unit 120 divides nodes {s, v0, v1, v3, v4, v6} which are not leaf nodes in the broadcast tree as primary nodes and divides the leaf nodes {v2, v5, v7, v8, v9} as secondary nodes. Thereafter, the scheduling unit 120 schedules to transmit data to the primary node in the order of selecting the parent nodes from the source node.

Specifically, the source node S is scheduled to transmit data in a time slot 0 of a first schedule period (that is, a schedule period 0). The source node S is scheduled as a transmission node for a node v0, a node v1, and a node v2 in a time slot 0 of the schedule period 0. This means that the node v0, the node v1, and the node v2 are allocated to the time slot 0 and scheduled to receive data in the time slot 0.

The node v3 is allocated to a time slot 1 and is scheduled to receive data in the time slot 1. That is, the node v3 is scheduled to receive data from node v0 in the time slot 1. The node v4 is allocated to a time slot 2 and is scheduled to receive data in the time slot 2. That is, the node v4 is scheduled to receive data from the node v3 in the time slot 2. As described above, the time slot allocation to the primary node is sequentially performed. Here, even though the nodes v1 and v3 cause the collision in the common neighboring node v5, the nodes v1 and v3 are scheduled to transmit data in the time slot 2.

As described above, when scheduling for the primary node is completed, the scheduling unit 120 schedules the secondary node.

The secondary node includes {v2, v5, v7, v8, v9} and among them, a collision-generated node and a node which receives data in advance are detected. The node v2, the node v7, and the node v8 are leaf nodes and scheduled to receive data from the primary node and the node v5 is a collision-generated node. Therefore, the scheduling unit 120 schedules only the node v5 of the secondary node. That is, the scheduling unit 120 reallocates the time slot 6 of the second schedule period (that is, the schedule period 1) to the node v5 which is a collision-generated node and schedules to receive data from the node v3 in the time slot 6.

As described above, the scheduling for all the descendent nodes of the source node is sequentially performed. As a result, as illustrated in FIG. 6A and FIG. 6B, the time slot 6 is required until the broadcast of the data to the remaining sensor nodes (sink node) from the source node S is completed.

FIG. 7 is a flowchart illustrating a scheduling method of a wireless network according to an exemplary embodiment of the present disclosure.

Referring to FIG. 7, a scheduling device identifies a node in which data to be transmitted is generated, among a plurality of nodes of a wireless network to which a duty cycle is applied, to set the node as a source node in step S710.

Next to step S710, the scheduling device generates a broadcast tree to transmit data from the source node to the sink node (the remaining nodes) in step S710. In this case, the scheduling device may connect the nodes not by the level, but by the order to configure a broadcast tree in which the waiting time is minimized.

Next to step S720, the scheduling device divides the nodes of the broadcast tree into a primary node and a secondary node based on predetermined criteria in step S730 and allocates time slots in which nodes included in the primary node operate in step S740. In this case, the scheduling device schedules the transmission node which transmits data in the time slot allocated to each node and schedules so as not to allow the data transmission collision for the primary node.

When the scheduling for the primary node is completed, the scheduling device detects a node in which data has been already received and the collision is generated from the secondary node in step S750. In this case, the node which receives data in advance is excluded from a scheduling target.

When step S750 is performed, the scheduling device reallocates a time slot in which the collision-generated node operates in step S760. In this case, the scheduling device reallocates a time slot of a next schedule period to the collision-generated node and schedules the transmission node which transmits data in the reallocated time slot.

The above-described exemplary embodiments of the present invention may be created by a computer-executable program and implemented in a general use digital computer which operates the program using a computer-readable medium.

The computer-readable recording medium includes a magnetic storage medium (for example, a ROM, a floppy disk, and a hard disk) and an optical reading medium (for example, CD-ROM and a DVD).

For now, the present invention has been described with reference to the exemplary embodiments. It is understood by those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

What is claimed is:

1. A method of scheduling a wireless network, the method comprising:
    generating a broadcast tree to transmit data from a source node to a sink node;
    dividing nodes included in the broadcast tree into a primary node which does not allow collision and a secondary node which allows collision when initially receiving data; and
    allocating time slots in which the nodes operate, based on a result of the dividing of the nodes.

2. The method according to claim 1, wherein the allocating of the time slots comprises detecting a collision-generated node among the nodes, and reallocating a time slot, among the time slots, in which the collision-generated node operates.

3. The method according to claim 2, wherein the reallocating of the time slot, slot comprises reallocating the time slot, which is of a next schedule period, to the collision-generated node, and scheduling a transmission node, among the nodes, which transmits the data in the reallocated time slot.

4. The method according to claim 1, wherein the dividing of the nodes is based on which of the nodes are leaf nodes.

5. The method according to claim 4, wherein the dividing of the nodes comprises, when a node among the nodes is not a leaf node, designating the node as the primary node, and when the node is a leaf node, designating the node as the secondary node.

6. The method according to claim 1, wherein the generating of the broadcast tree comprises, when the broadcast tree is generated based on an order, sequentially setting a parent node, among the nodes, from a node having a greatest number of nodes which are not covered among child nodes of the source node to hierarchically designate the nodes into a plurality of levels to generate the broadcast tree.

7. The method according to claim 1, wherein the generating of the broadcast tree comprises, when the broadcast tree is generated based on maximum independent set information, selecting a node having a highest order at every level set with respect to the source node as an independent node from the broadcast tree, setting all nodes adjacent to the selected independent node as dependent nodes, and connecting the nodes in order from the independent node to the dependent nodes at each level to generate the broadcast tree.

8. A scheduling apparatus for a wireless network, comprising:
    one or more processors configured to:
    generate a broadcast tree to transmit data from a source node to a sink node;
    divide nodes included in the broadcast tree into a primary node in which collision is not allowed and a secondary node in which collision is allowed when initially receiving data; and
    allocate time slots in which the nodes operate, based on a result of the division of the nodes.

9. The scheduling apparatus according to claim 8, wherein the one or more processors are further configured to detect a collision-generated node among the nodes, and reallocate a time slot, among the time slots, in which the collision-generated node operates.

10. The scheduling apparatus according to claim 9, wherein the one or more processors are further configured to reallocate the time slot, which is of a next schedule period, to the collision-generated node, and schedule a transmission node, among the nodes, which transmits the data to the reallocated time slot.

11. The scheduling apparatus according to claim 8, wherein the division of the nodes is based on which of the nodes are leaf nodes.

12. The scheduling apparatus according to claim 11, wherein the one or more processors are further configured to, when a node among the nodes is not a leaf node or a common reception node, designating the node as the primary node, and when the node is a leaf node or a common reception node, designating the node as the secondary node.

13. The scheduling apparatus according to claim 8, wherein the one or more processors are further configured to, when the broadcast tree is generated based on an order, sequentially set a parent node, among the nodes, from a sensor node having a greatest number of nodes which are not covered among child nodes of the source node to hierarchically designate the of nodes into a plurality of levels to generate the broadcast tree.

14. The scheduling apparatus according to claim 8, wherein the one or more processors are further configured to, when the broadcast tree is generated based on maximum independent set information, select a node having a highest order at every level set with respect to the source node as an independent node from the broadcast tree, set all nodes adjacent to the selected independent node as dependent nodes, and connect the nodes in order from the independent node to the dependent nodes at each level to generate the broadcast tree.

15. A scheduling method of a wireless network including a plurality of nodes, the method comprising:
  generating a broadcast tree to transmit data from a source node to a sink node;
  dividing nodes included in the broadcast tree into a primary node which does not allow collision and a secondary node which allows collision at the time of receiving data, in accordance with predetermined criteria; and
  allocating a time slot in which nodes included in the broadcast tree operate, based on a result of the dividing,
  wherein during the generating of the broadcast tree, when the broadcast tree is generated based on an order, a parent node is sequentially set from a node having a greatest number of nodes which are not covered among child nodes of the source node to hierarchically form the plurality of nodes by a plurality of levels to generate the order-based broadcast tree.

* * * * *